(12) United States Patent
Badiei

(10) Patent No.: US 11,519,833 B2
(45) Date of Patent: Dec. 6, 2022

(54) SAMPLE VIALS, RACK MOUNTS AND SAMPLING DEVICES USING THEM

(71) Applicant: Hamid Badiei, Woodbridge (CA)

(72) Inventor: Hamid Badiei, Woodbridge (CA)

(73) Assignee: PERKINELMER HEALTH SCIENCES CANADA, INC., Woodbridge (CA)

( * ) Notice: Subject to any disclaimer, the term of this patent is extended or adjusted under 35 U.S.C. 154(b) by 441 days.

(21) Appl. No.: 16/662,525

(22) Filed: Oct. 24, 2019

(65) Prior Publication Data

US 2020/0132573 A1 Apr. 30, 2020

Related U.S. Application Data

(60) Provisional application No. 62/750,101, filed on Oct. 24, 2018.

(51) Int. Cl.
| | |
|---|---|
| *G01N 1/38* | (2006.01) |
| *B01L 9/06* | (2006.01) |
| *B01F 29/80* | (2022.01) |
| *B01F 29/00* | (2022.01) |
| *B01F 29/322* | (2022.01) |

(52) U.S. Cl.
CPC ............ *G01N 1/38* (2013.01); *B01F 29/322* (2022.01); *B01F 29/40362* (2022.01); *B01F 29/80* (2022.01); *B01F 29/82* (2022.01); *B01L 9/06* (2013.01); *B01L 2200/025* (2013.01); *G01N 2001/386* (2013.01)

(58) Field of Classification Search
CPC .. G01N 1/38; G01N 2001/386; B01F 29/322; B01F 29/40362; B01F 29/80; B01F 29/82; B01L 9/06; B01L 2200/025
See application file for complete search history.

(56) References Cited

U.S. PATENT DOCUMENTS

2006/0114553 A1* 6/2006 Laudo .................. G02B 21/365
359/368

FOREIGN PATENT DOCUMENTS

| CA | 1063833 | 10/1979 |
|---|---|---|
| CN | 204193982 | 3/2015 |
| CN | 205413112 | 8/2016 |
| CN | 206103990 | 4/2017 |
| CN | 20816041 | 11/2018 |
| CN | 110142077 | 8/2019 |
| CN | 209576773 | 11/2019 |
| KR | 101482198 | 1/2015 |

OTHER PUBLICATIONS

ISR/WO for PCT/IB2019/059138 mailed on Feb. 27, 2020.

* cited by examiner

*Primary Examiner* — Benjamin R Schmitt
(74) *Attorney, Agent, or Firm* — Christopher Rhodes; Rhodes IP PLC

(57) ABSTRACT

Auto sampler rack mounts and fluid vials that can be used with them are described. In some configurations, the rack mount can be configured to spin each fluid vial rotationally to assist in mixing or stirring of fluid in the vial and/or to maintain fluid homogeneity. If desired, the fluid vial may include one or more internal features to assist in the mixing or stirring.

20 Claims, 14 Drawing Sheets

SAMPLE VIALS, RACK MOUNTS AND SAMPLING DEVICES USING THEM

PRIORITY APPLICATION

This application claims priority to, and the benefit of, U.S. Provisional Application No. 62/750,101 filed on Oct. 24, 2018, the entire disclosure of which is hereby incorporated herein by reference.

TECHNOLOGICAL FIELD

Certain configurations described herein are directed to a rack mount that can be used with an auto sampler. In some configurations, the rack mount may be configured to independently rotate a plurality of separate vials in different rotational directions to keep particles or particulate matter suspended in a fluid in the vial.

BACKGROUND

Liquid and gaseous samples often include particles or particulate matter. The more dense particles or particulate matter often settles to the bottom of a sampling vial or container, which results in a non-homogeneous sample and can lead to reduced precision and accuracy.

SUMMARY

Certain aspects of rack mounts, fluid vials and methods of using them are describes. The illustrated configurations provide a user friendly description of certain aspects and configurations and other additional aspects, configurations and illustrations of rack mounts and fluid vials are possible.

In another aspect, an auto sampler rack mount configured to couple to an output shaft of a motor and configured to receive a single fluid vial at each of a plurality of fluid vial sites of the auto sampler rack mount is described. In certain embodiments, the auto sampler rack mount comprises a plurality of independent rotatable devices mechanically coupled to each other. In some instances, a respective rotatable device is coupled to each fluid vial site of the auto sampler rack mount that is configured to receive a single fluid vial. In certain examples, the rotatable devices together are configured to rotate each coupled fluid vial and are configured to rotate adjacent fluid vials in opposite circumferential directions, e.g., adjacent vials rotate in opposite circumferential directions when viewed from a top of the vials.

In certain embodiments, the auto sampler rack mount is configured to reverse a rotational direction of each fluid vial after a first rotation period. In some examples, each of the plurality of independent rotatable device comprises a planar gear comprising a plurality of teeth configured to engage teeth on an adjacent planar gear. In other examples, each of the plurality of independent rotatable devices comprises a pulley configured to frictionally engage a belt, wherein at least one of the pulleys is configured to couple to the output shaft of the motor, and wherein rotational movement of the pulley coupled to the output shaft of the motor is operative to rotate each of the independent rotatable pulleys with adjacent rotatable pulleys being rotated in opposite circumferential directions. In additional examples, each independent rotatable device is sized and arranged to rotate at a same speed. In some embodiments, at least one of the independent rotatable devices is configured to rotate at a different speed. In certain examples, each independent rotatable device is coupled to a receptacle configured to receive a terminal end of a respective fluid vial. In other examples, each fluid vial site comprises a magnet configured to magnetically couple to a magnet on the fluid vial to retain the fluid vial at the fluid vial site. In some examples, the rack mount comprises a sensor configured to determine if fluid in at least one fluid vial is being mixed, e.g., an optical sensor, acoustic sensor, etc. In certain embodiments, the auto sampler rack mount is configured to continuously agitate fluid received by the fluid vial by rotating each fluid vial in alternating circumferential directions to keep particles in fluid in the fluid vial from settling.

In another aspect, an auto sampler vial configured to receive a fluid and retain the fluid prior to sampling of the fluid is described. In some examples, the auto sampler vial comprises a first end configured to receive the fluid and a second end configured to couple to an auto sampler rack mount. In some examples, the auto sampler vial further comprises at least one internal feature configured to stir the received in the auto sampler vial when the auto sampler vial is circumferentially rotated in a first rotational direction and is configured to stir the fluid received in the auto sampler vial when the auto sampler vial is circumferentially rotated in a second rotational direction opposite the first rotational direction.

In certain configurations, the second end is configured to reversibly couple to the auto sampler rack mount at an independent fluid vial site to rotate the fluid vial circumferentially when a rotatable device coupled to the independent fluid vial site of the auto sampler rack mount rotates. In other configurations, the second end reversibly couples to the independent fluid vial site of the auto sampler rack mount through a friction fit. In some embodiments, the second end reversibly couples to the independent fluid vial site of the auto sampler rack mount through a first magnet on the independent fluid vial site and a second magnet on the fluid vial. In other examples, the vial may comprise a mixing feature at the second end of the fluid vial, wherein the mixing feature is configured to generate Eddy currents in the fluid in the fluid vial when the fluid vial rotates.

In another aspect, a method of mixing fluid in a fluid vial prior to sampling of the fluid from the fluid vial is described. In some examples, the method comprises rotationally spinning the fluid vial in a first rotational direction for a first rotational period to mix the fluid using an internal mixing feature in the fluid vial. The method may also comprise rotationally spinning the fluid vial in a second rotational direction opposite the first rotational direction for a second rotational period to mix the fluid using the internal mixing feature in the fluid vial.

In certain examples, the method comprises sequentially spinning the fluid vial in the first rotational direction and the second rotational direction to maintain a mixed fluid. In other examples, the method comprises spinning adjacent fluid vials in opposite rotational directions during the first rotational period. In certain instances, the method comprises spinning adjacent fluid vials in similar rotational directions during the first rotational period. In some examples, each fluid vial comprises a first end configured to receive the fluid and a second end comprising a mixture feature, wherein the mixing feature is configured to generate Eddy currents in the fluid in the fluid vial when the fluid vial rotates.

In an additional aspect, an auto sampler system comprises a rack mount and motor. In some examples, the rack mount is configured to receive a single fluid vial at each of a plurality of fluid vial sites, the rack mount comprising a plurality of independent rotatable devices mechanically coupled to each other. In certain instances, at least one of the rotatable devices is coupled to a drive shaft of the motor. In some examples, a respective rotatable device is coupled to each fluid vial site of the rack mount that is configured to receive a single fluid vial. In other examples, the rotatable devices together are configured to rotate each coupled fluid vial in a first rotational direction and a second rotational direction opposite the first rotational direction.

In certain embodiments, the rotational devices are together configured to rotate adjacent fluid vials in opposite rotational directions. In other embodiments, the motor is configured to reverse a rotational direction of the drive shaft to reverse rotational direction of each fluid vial after a first rotation period. In certain examples, each of the plurality of independent rotatable devices comprises a planar gear comprising a plurality of teeth configured to engage teeth on an adjacent planar gear. In certain examples, each of the plurality of independent rotatable devices comprises a pulley configured to frictionally engage a belt, wherein at least one of the pulleys is configured to couple to the output shaft of the motor, and wherein rotational movement of the pulley coupled to the output shaft of the motor is operative to rotate each of the independent rotatable pulleys with adjacent rotatable pulleys being rotated in opposite circumferential directions. In some configurations, each of the plurality of independent rotatable devices comprises a pulley configured to frictionally engage a belt, wherein at least one of the pulleys is configured to couple to the output shaft of the motor, and wherein rotational movement of the pulley coupled to the output shaft of the motor is operative to rotate each of the independent rotatable pulleys with adjacent rotatable pulleys being rotated in a same circumferential direction. In other instances, at least one of the independent rotatable devices is configured to rotate at a different speed. In some examples, each fluid vial site comprises a magnet configured to magnetically couple to a magnet on the fluid vial to retain the fluid vial at the fluid vial site. In certain embodiments, the rack mount comprises a sensor configured to determine if fluid in at least one fluid vial is being mixed. In some examples, the rack mount is configured to continuously agitate fluid received by each fluid vial by rotating each fluid vial in alternating circumferential directions to keep particles in fluid in the fluid vials from settling.

In another aspect, a mass spectrometer comprising a sample introduction device fluidically coupled to an ionization device is provided. In some instances, the sample introduction device can be fluidically coupled to an auto sampler rack mount comprising a plurality of independent rotatable devices mechanically coupled to each other, wherein at least one of the rotatable devices is coupled to a drive shaft of the motor, wherein a respective rotatable device is coupled to each fluid vial site of the rack mount that is configured to receive a single fluid vial, and wherein the rotatable devices together are configured to rotate each coupled fluid vial in a first rotational direction and a second rotation direction opposite the first rotational direction, and wherein the rotational devices are together configured to rotate adjacent fluid vials in opposite rotational directions.

In certain examples, the mass spectrometer comprises an ionization device, a mass analyzer and a detector, wherein the sample introduction device is fluidically coupled to the ionization device, wherein the ionization device is fluidically coupled to the mass analyzer, wherein the mass analyzer is fluidically coupled to the detector, and wherein the sample introduction device is configured to receive fluid from a fluid vial in the rack mount. In other embodiments, the ionization device comprises an inductively coupled plasma. In some examples, the mass analyzer comprises at least one quadrupole. In certain embodiments, the detector comprises an electron multiplier. In other examples, the detector comprises a time of flight device. In some embodiments, the auto sampler rack mount is configured to reverse a rotational direction of each fluid vial after a first rotation period. In other embodiments, each of the plurality of independent rotatable device comprises a planar gear comprising a plurality of teeth configured to engage teeth on an adjacent planar gear. In some instances, each of the plurality of independent rotatable devices comprises a pulley configured to frictionally engage a belt, wherein at least one of the pulleys is configured to couple to the output shaft of the motor, and wherein rotational movement of the pulley coupled to the output shaft of the motor is operative to rotate each of the independent rotatable pulleys with adjacent rotatable pulleys being rotated in opposite circumferential directions. In some configurations, the rack mount is configured to continuously agitate fluid received by the fluid vial by rotating each fluid vial in alternating circumferential directions to keep particles in fluid in the fluid vial from settling.

In another aspect, a gas chromatography device comprising an auto sampler system fluidically coupled to a gas chromatography column is provided. In some embodiments, the auto sampler system comprises a rack mount and motor, wherein the rack mount is configured to receive a single fluid vial at each of a plurality of fluid vial sites, the rack mount comprising a plurality of independent rotatable devices mechanically coupled to each other, wherein at least one of the rotatable devices is coupled to a drive shaft of the motor, wherein a respective rotatable device is coupled to each fluid vial site of the rack mount that is configured to receive a single fluid vial, and wherein the rotatable devices together are configured to rotate each coupled fluid vial in a first rotational direction and a second rotation direction opposite the first rotational direction, and wherein the rotational devices are together configured to rotate adjacent fluid vials in opposite rotational directions.

In an additional aspect, a liquid chromatography device comprising an auto sampler system fluidically coupled to an injector is described. In some configuration, the injector is fluidically coupled to a liquid chromatography column, wherein the auto sampler system comprises a rack mount and motor, wherein the rack mount is configured to receive a single fluid vial at each of a plurality of fluid vial sites, the rack mount comprising a plurality of independent rotatable devices mechanically coupled to each other, wherein at least one of the rotatable devices is coupled to a drive shaft of the motor, wherein a respective rotatable device is coupled to each fluid vial site of the rack mount that is configured to receive a single fluid vial, and wherein the rotatable devices together are configured to rotate each coupled fluid vial in a first rotational direction and a second rotation direction opposite the first rotational direction, and wherein the rotational devices are together configured to rotate adjacent fluid vials in opposite rotational directions.

In another aspect, a method of mixing fluid in a fluid vial prior to sampling of the fluid from the fluid vial comprises rotationally spinning the fluid vial in a first rotational direction for a first rotational period to mix the fluid using an internal mixing feature in the fluid vial, and rotationally spinning the fluid vial in a second rotational direction opposite the first rotational direction for a second rotational period to mix the fluid using the internal mixing feature in the fluid vial. In some examples, the method comprises sequentially spinning the fluid vial in the first rotational direction and the second rotational direction to maintain a mixed fluid.

In another aspect, a kit comprising one or more fluid vials as described herein and written or electronic instructions for using the fluid vial is provided. In some examples, the kit may further comprise an auto sampler rack mount as described herein.

In an additional aspect, a kit comprising one or more auto sampler rack mounts as described herein and written or electronic instructions for using the auto sampler rack mount is provided. In some examples, the kit may further comprise one or more fluid vials as described herein.

Additional aspects, features, configurations and embodiments are described in more detail below.

BRIEF DESCRIPTION OF THE SEVERAL VIEWS OF THE DRAWINGS

Certain specific configurations of sample vials and a rack mount that can be used to increase homogeneity of samples are described with reference to the accompanying figures in which.

It will be recognized by the skilled person in the art, given the benefit of this disclosure, that not necessarily all features of the rack mounts, vials and systems are shown in the figures. Certain exemplary components are shown to facilitate a better understanding of some of the novel and inventive aspects while other components are omitted to provide a more user friendly description.

DETAILED DESCRIPTION

Certain configurations are described below of vials and their use with a rack mount system. The vials can be configured in many different manners and generally comprise one or more internal features that is operative to stir/mix, to at least some degree, a fluid in the vial. For example, the internal feature in the vial, when the vial is coupled to the rack mount, can assist in mixing/stirring of the fluid, e.g., a liquid or a gas, and any materials in the vial to maintain the fluid homogeneity in the vial. Various illustrations of vials, rack mounts and systems that can use the vials and rack mounts are discussed in more detail below.

Many suspended samples including those with nanoparticles, single cells, or slurries require that the sample remains in suspension until the time the samples are sampled for analysis. Existing rack mounts designed for auto samplers do not provide any means of keeping the sample mixed, shaken, or agitated until the time of analysis. These designs contribute to analysis error due to inhomogeneity as samples can continue to settle in vials while waiting for sampling.

Certain embodiments described below are directed to vials and their use in an auto sampler rack mount to allow all the vials in the rack mount to spin, i.e., rotationally spin, back and forth simultaneously to assist in keeping the analyte materials suspended in the fluid media until and during the time of sampling by an auto sampler probe or other device. While not required in all configurations, a single motor can drive all the vials in the rack mount while providing an easy drop-in method for engaging with the driving force of the motor. The vial itself may also comprise internal features to promote further agitation/stirring during the spinning of the vial.

Figure 1:
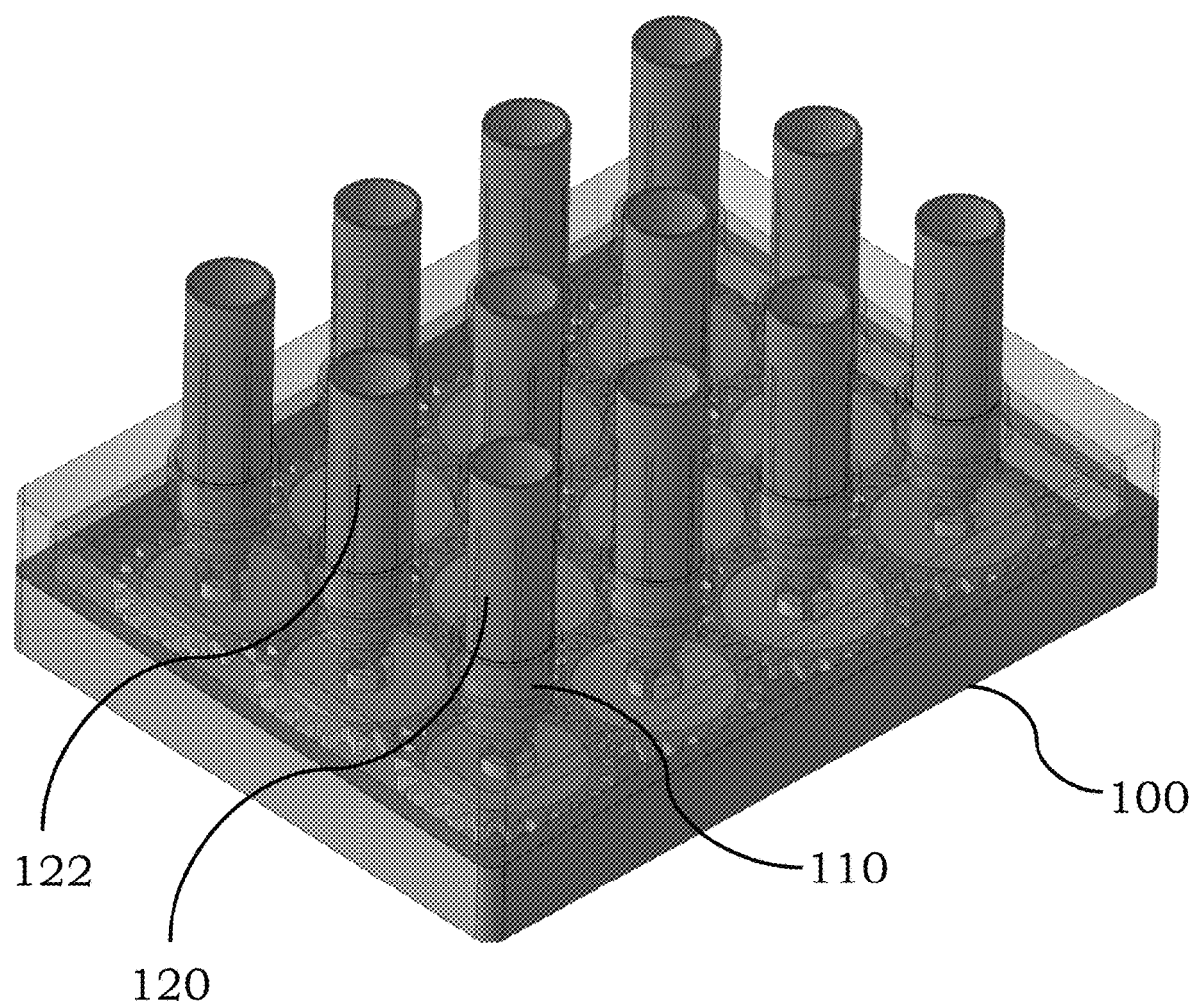
FIG. 1 is an illustration of a rack mount comprising a plurality of coupled fluid vials, in accordance with certain embodiments.

In some embodiments, a rack mount 100 is shown in FIG. 1 as comprising a plurality of fluid vial sites, such as fluid vial site 110, each with a single fluid vial coupled to a respective site. For example, fluid vial 120 is shown as being coupled to fluid vial site 110. In FIG. 1, there are twelve fluid vials but fewer or more than twelve fluid vials and fluid vial sites may be present as desired. The fluid vial sites can be configured to keep each fluid vial in a substantially vertical position, relative to the horizontal, planar surface of the rack mount 100, to facilitate sampling from each vial from a top opening of each vial. In some examples, each fluid vial site can be sized and arranged to receive a single fluid vial by way of a friction fit to retain the fluid vial in that particular site. In other instances, a magnet can be present on or in the fluid vial site and can magnetically couple to a magnet on the fluid vial. In additional configurations, the fluid site may comprise threads which can mate to corresponding threads on the end of the fluid vial. In other instances, bayonets features, ball-and-socket features or other features which can enhance retention of a fluid vial in each fluid vial site can be present. As noted herein and as discussed in more detail below, the rack mount 100 can be configured with suitable rotatable devices coupled to each fluid vial site to cause rotation of the coupled fluid vials. For example, fluid vial 120 can be rotated in a clockwise direction (when viewed from the top of the fluid vial 120), and an adjacent fluid vial 122 can be rotated simultaneously in a counterclockwise direction (when viewed from the top of the fluid vial 122). After a first rotation period, the direction of rotation can be reversed to enhance mixing/stirring of the fluid present in the fluid vial. For example, fluid vial 120 can then be rotated in a counterclockwise direction, and fluid vial 122 can be rotated in a clockwise direction. By periodically altering the rotational direction of each fluid vial, enhanced mixing/stirring of the fluid in each vial can be achieved. In addition, particles may be suspended in a more homogeneous distribution than if rotation only in a single direction is performed.

Figure 2:
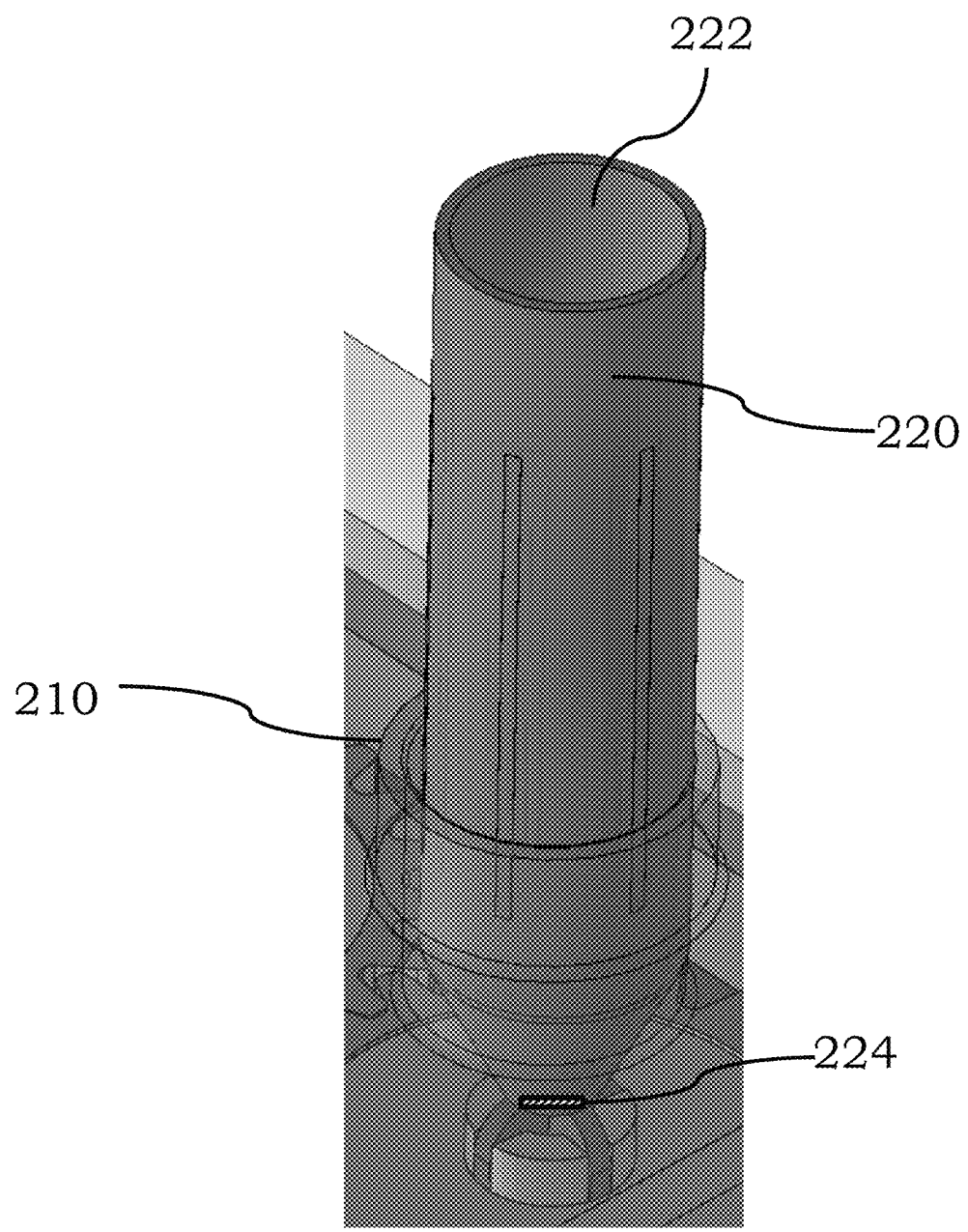
FIG. 2 is an illustration showing coupling of a single fluid vial to a rack mount site, in accordance with some configurations.

In certain embodiments, the exact configuration of each fluid vial site on the rack mount may vary and need not be the same. As shown in FIG. 2, a fluid vial 220 may couple to a rack mount through a cone or cup-shaped fluid vial coupler 210. In one instance, the fluid vial coupler 210 can be sized and arranged to lock the fluid vial 220 in place such that fluid vial 220 and vial coupler 210 generally rotate together in the same circumferential direction. In another configuration, the vial coupler 210 can act as a surface mounted sleeve that retains the fluid vial 220 in a generally upright position and that permits coupling of the fluid vial 220 to an underlying coupler on the rack mount surface. In this latter configuration, the fluid vial site 210 typically does not rotate itself but permits rotation of the fluid vial 220 as the underlying coupler rotates. The fluid vial site 210 in the latter configuration acts to keep the fluid vial from tipping or dislodging during rotation and comprises a suitable amount of open space between an outer wall of the fluid vial 220 and an inner wall of the coupler 210. The space between the fluid vial site 210 and the fluid vial 220 can permit the fluid vial 220 to "wobble" to some extent and enhance agitation/mixing of the fluid. The exact height of the coupler 210 can vary and in some instances, the coupler 210 is sized so it engages at least a lower ¼, ⅓ or ½ of the entire length of the fluid vial. Where high rotational velocities are implemented, it may be desirable to increase the length of the coupler 210 to assist in secure retention of the fluid vials. An optional magnet 224 is shown at a closed or second end of the vial 220. If desired, a magnet may also be present in the coupler 210 to enhance retention of the vial 220 in the coupler 210.

In certain embodiments, the exact spin rate of the coupler and/or fluid vial may also vary depending on the desired mixing, the sample components and other desired effects. Where the fluid comprises one or more biological cells, the spin rate is desirably high enough to keep the cells suspended in the liquid but not so high to cause lysis or shearing of the cells. Similarly, where nanoparticles, nanostructures or nanosystems are present, the spin rate is high enough to keep these materials suspended in the fluid but not so high to shear or cause decomposition of the materials. In addition, the spinning rate of the vials is not so high to cause fluid to spill out of the fluid vial. Referring again to FIG. 2, a fluid vial may comprise an open top or first end 222 to permit a sampling probe to be inserted into the fluid vial to withdraw liquid sample for analysis. If the fluid vial is substantially filled with liquid and high spin rates are used, liquid may be ejected from the fluid vial and can be lost or end up in an adjacent vial. Where it is desirable to use high spin rates or where the fluid comprises a gas with suspended particulate matter, the top 222 may comprise a septum or seal to assist in retaining the materials in the fluid vial 220. The septum or seal can be punctured using a needle probe or other suitable device to sample the materials within the sealed fluid vial.

In some examples, the fluid vial couplers, rack mount or both may comprise one or more heating or cooling devices to assist in controlling the temperature of the materials in the fluid vials. For example, where living biological cells are being analyzed by mass spectrometry for metal content, it may be desirable to keep the cells alive immediately prior to sampling. The fluid vial can be thermally coupled to a heated fluid vial site to maintain the temperature of the fluid at a suitable temperature to promote biological activity and/or deter apoptosis or other degradative mechanisms. Where chemical reactions are to be carried out within the fluid vial, a suitable reaction temperature can be used to promote a desired reaction product. The fluid vial may comprise various polymers, metals, elastomers, insulators or other materials to promote or deter thermal transfer as desired. In addition, the fluid vial may comprise non-stick coatings such as polytetrafluoroethylene or other non-stick materials on inner surfaces to deter particles or particulate matter from sticking to the inner walls of the fluid vials. The exact volume of the vials may vary, and it is typically less than 100 mL though it could be larger if desired. For example, the vials may be configured top hold up to about 150 mL, up to about 100 mL, up to about 50 mL or up to about 10 mL.

Figure 3A:
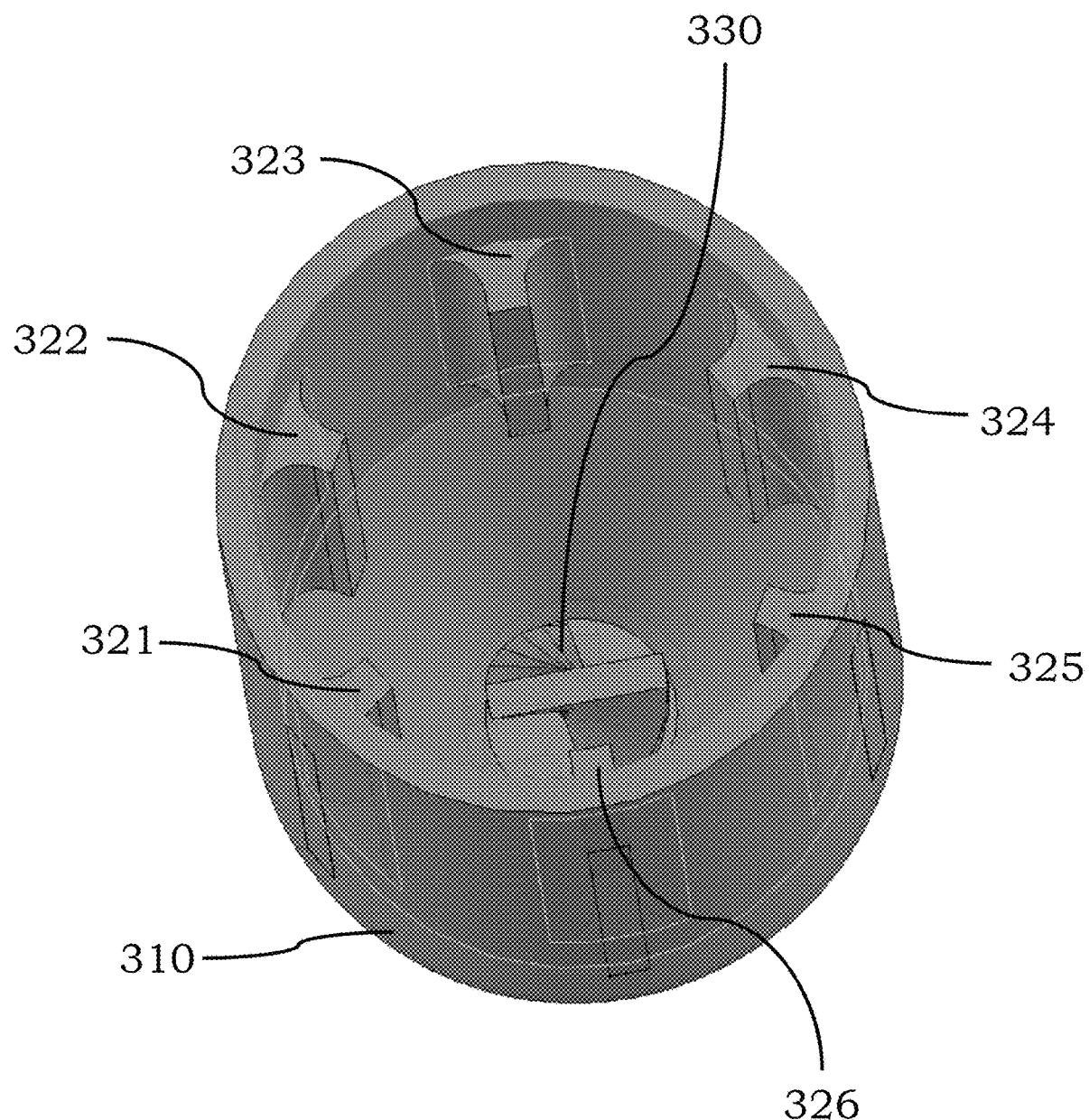
FIGS. 3A, 3B and 3C are illustrations showing internal features of a fluid vial, in accordance with some embodiments.
Figure 3B:
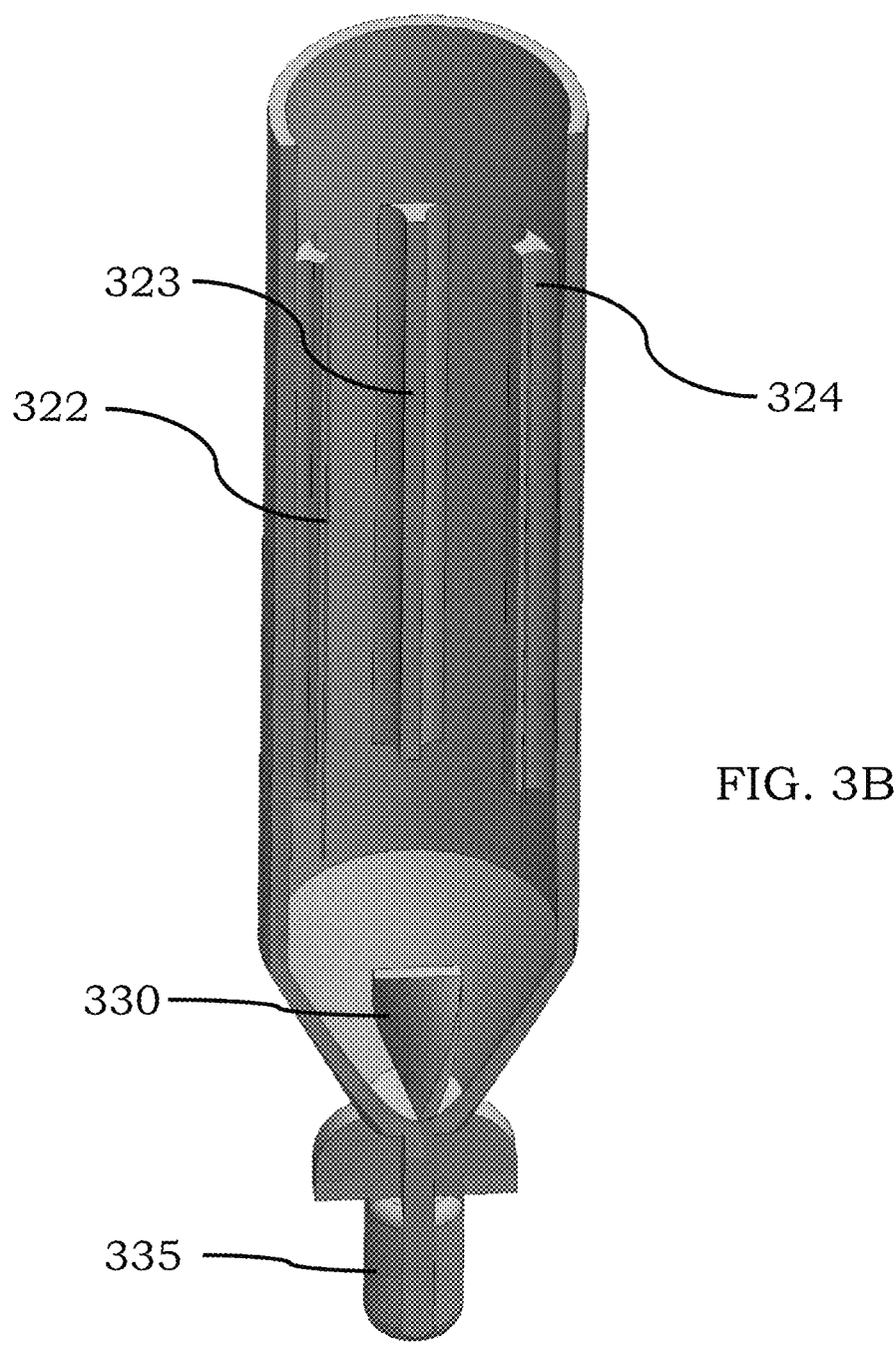
Figure 3C:
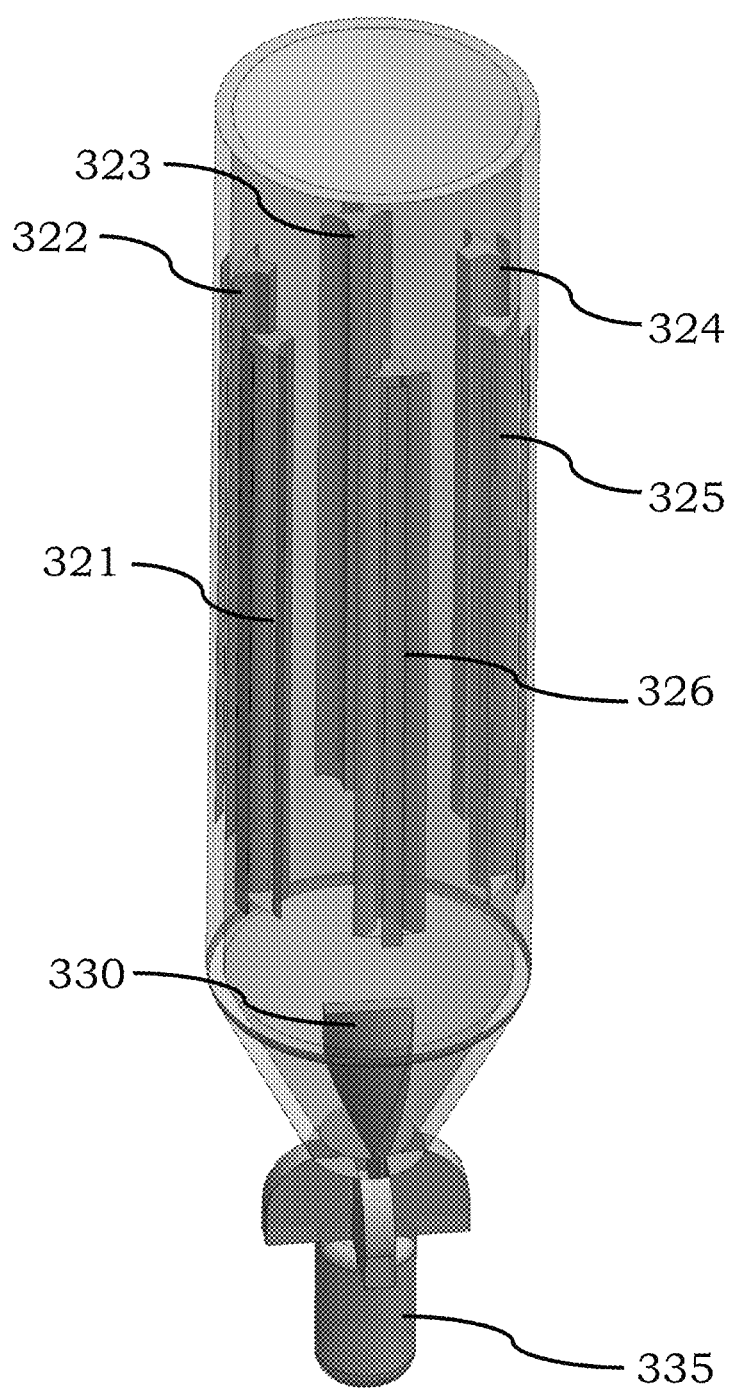

In certain configurations, the fluid vials may comprise one or more internal stirring features. Without wishing to be bound by any one particular configuration, the stirring features can be designed to induce Eddy currents or turbulence within the fluid to enhance stirring/mixing. As the fluid vial spins, these stirring features cause the fluid, which is stationary prior to stirring, to contact the stirring features. The resulting fluid currents mix the materials in the fluid. After some period of spinning the vial in one circumferential direction, the relative fluid velocity will approach zero as it equilibrates with rotational movement of the fluid vial. To promote continued mixing, the fluid vial can then be rotated in an opposite direction to promote further movement/mixing of the fluid. This sequential clockwise then counter-clockwise rotation (or vice versa) of each fluid vial can be maintained prior to and during sampling of the fluid to keep the particles and/or particulate matter in a more homogeneous distribution in the fluid. Referring to FIG. 3A, a top view of a fluid vial 310 is shown. The vial 310 comprises a plurality of internal features 321-326 that project into an internal space of the fluid vial 310. These internal features can promote mixing of the fluid in the fluid vial 310 as the vial spins. The vial 310 may also comprise a mixing feature 330 in a terminal end of the vial 310. This mixing feature 330 can be propeller shaped or take other shapes to enhance formation of a vortex or enhance turbulence in the fluid within the fluid vial 310. FIG. 3B shows a cut away view of some of the internal features 321-323 and the lower mixing feature 330. FIG. 3C shows the internal features 321-326, the lower mixing feature 330 and a coupler 335 at the end of vial that can be used to reversibly couple the vial to the rack mount.

Figure 4:
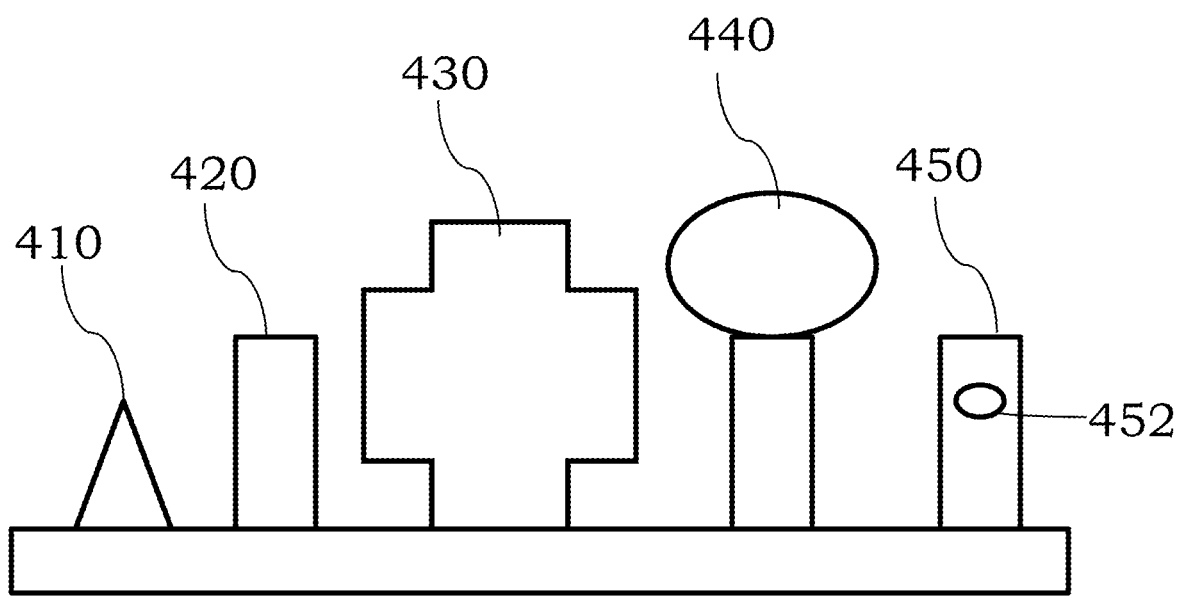
FIG. 4 is an illustration showing some of the various shapes that can be used for the internal features of the fluid vial, in accordance with certain examples.

In some embodiments, while the internal features 321-326 are shown as being substantially symmetric, symmetry is not required. Symmetric shapes can result in similar mixing when the fluid vial is rotated in different rotational directions. In addition, the shape of the internal feature need not be trapezoidal shaped as shown in FIG. 3A. Various other shapes for the internal features can also be present e.g., rectangular, elliptical, square, etc., and the internal features in any one vial need not have the same shape or height. Referring to FIG. 4, various shapes for internal features are shown including a triangular internal feature 410, a rectangular internal feature 420, a cross-shaped internal feature 430, a paddle-shaped internal feature 440 and a rectangular shaped internal feature 450 comprising an aperture or opening 452. The presence of openings or apertures in the internal features may promote further mixing by promoting turbulent flow through the openings. The internal features may be rigid or may flex to some degree from the forces encountered within the vial and/or from the spinning. The internal features may be integral to the vial or may couple to the vial through a slot, opening or other feature or structure that can retain the internal feature in position during rotation of the vial.

Figure 5:
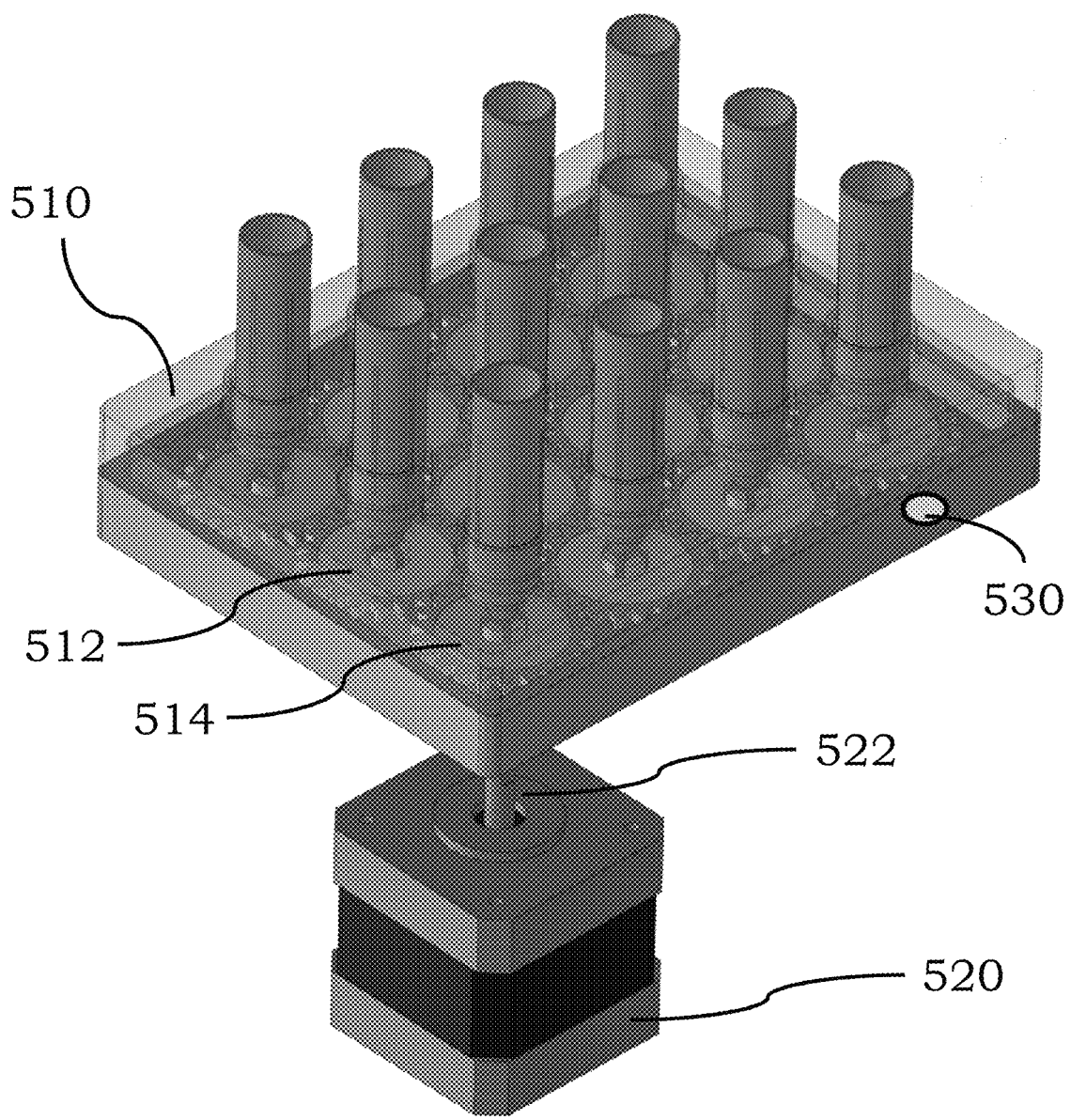
FIG. 5 is a perspective view showing a motor coupled to a rack mount, in accordance with some configurations.

In some embodiments, the rack mount systems described herein may comprise one or more rotatable devices which are configured to promote rotation of the fluid vials. Referring to FIG. 5, a rack mount 510 is shown as being coupled to a motor 520 through an output shaft 522 of the motor 520. The output shaft 522 can be coupled to planar mounted gears, such as gears 512, 514, in the rack mount 510. Rotation of the output shaft 522 causes the gears in the rack mount 510 also to rotate. By positioning the gears in a suitable manner, each adjacent fluid vial rotates in an opposite rotational direction. This opposite rotation can assist in balancing rotational forces that may be exerted on the rack mount 510 from rotation of the vials and prevent the rack mount 510 from wobbling or becoming unstable during spinning of the fluid vials. While not shown, a central gear or differential may be present on a bottom surface of the rack mount 510 and can be coupled to at least one planar gear to cause rotation of all gears in the rack mount 510. Alternatively, the output shaft 522 of the motor 520 can be directly coupled to one of the gears of the rack mount 520, e.g., through a coupling such as a U-joint or other fastener or coupler. All gears present in the rack mount can be sized and arranged to be the same or in some instances at least one gear can be sized and arranged differently. The exact type of motor used to drive the gears may vary and includes, but is not limited to, an AC motor, a DC motor, an induction motor, a servo motor, a stepper motor, and other suitable motors. The motor can be powered by a suitable power source including AC power sources, DC power sources, batteries, fuel cells, photovoltaic cells, wind power, or other suitable power sources. As discussed in more detail below, the motor 520 can be controlled using a processor or system which can control the rotational direction of the output shaft 522 of the motor 520. An optional sensor 530 is shown that can be used to verify if a vial, and/or a fluid therein, is spinning. The optional sensor 530 may be an optical sensor, an acoustic sensor, an electrical sensor or may take other forms. The optional sensor 530 may also be positioned anywhere in the rack mount 510 as desired or a plurality of sensors may be present if desired.

Figure 6A:
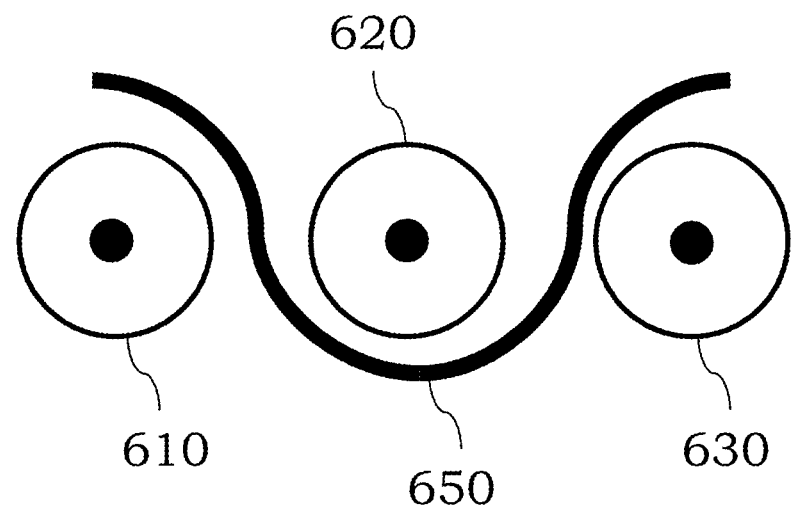
FIG. 6A is an illustration showing pulleys and a serpentine belt configuration.
Figure 6B:
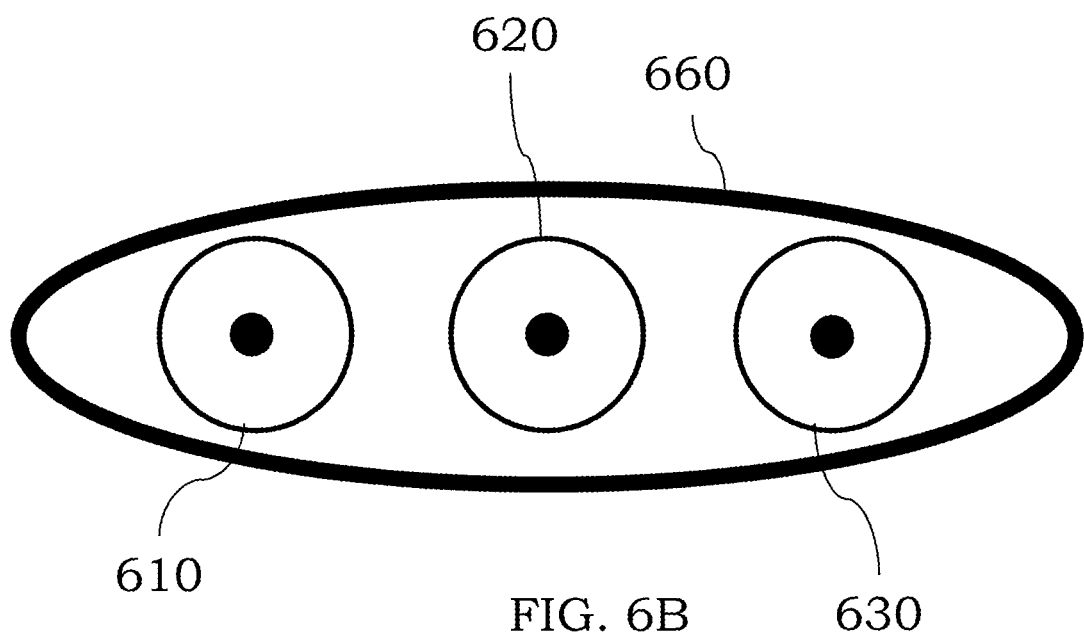
FIG. 6B is an illustration showing pulleys and an oval belt configuration, in accordance with some embodiments

In certain embodiments, the rack mount need not comprise gears but instead may comprise pulleys, belts, magnetic gears (e.g., magnomatics), or devices other than mechanical gears with teeth. An illustration of a plurality of pulleys that can be used in a rack mount is shown in FIG. 6A. The pulleys 610, 620, 630 are coupled to each other through a belt 650 (shown for illustration purposes as being pulled away from the pulleys 610, 620, 630) that can frictionally engage surfaces of the pulleys 610, 620 and 630 to cause them to rotate. One of the pulleys 610, 620, 630 can be mechanically coupled to a motor (not shown) to rotate that pulley. This rotation causes movement of the belt 650 and corresponding rotation of the other pulleys. In the configuration shown in FIG. 6A, the belt 650 is generally configured as a serpentine belt that causes adjacent pulleys to rotate in opposite directions, but the belt could be positioned in an oval configuration as shown by the belt 660 (shown pulled away from the pulleys) in FIG. 6B so the pulleys 610, 620 and 630 all rotate in the same general direction at any time.

Figure 7:
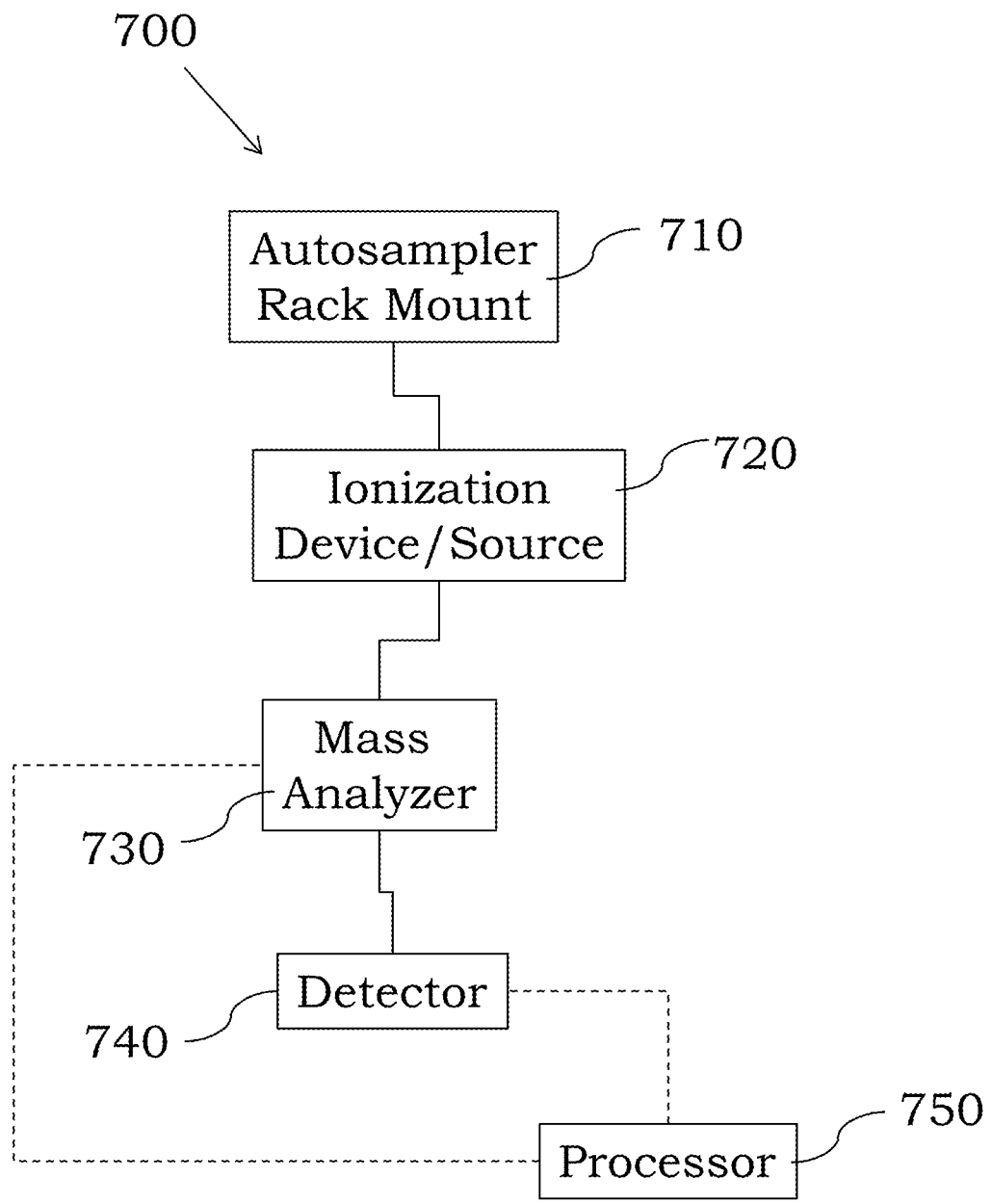
FIG. 7 is a block diagram showing a rack mount being used with certain components of a mass spectrometer system, in accordance with certain examples.

In certain embodiments, the rack mount systems and fluid vials described herein may be used in a mass spectrometer system comprising many different components or stages. One illustration of certain components is shown in FIG. 7 where the mass spectrometer 700 comprises an auto sampler rack mount 710, an ionization device 720, a mass analyzer 730 and a detector 740. While not shown, the system 700 also typically comprises a sample introduction device/fluid handler between the rack mount 710 and the ionization device/source 720. For example, a sample introduction device may comprise a needle/syringe (or other fluid handling devices or systems) that can sample fluid in the fluid vial and provide it to a downstream device for introduction into the ionization device/source 720. In some instances, the sample introduction device can be configured as an induction nebulizer, a non-induction nebulizer or a hybrid of the two, a concentric, cross flow, entrained, V-groove, parallel path, enhanced parallel path, flow blurring or piezoelectric nebulizers, a spray chamber, a chromatography device such as a gas chromatography device or other devices that can provide a sample to the ionization device 720. As noted herein, the fluid sample may comprise a gas and particles/particulate matter or liquid and particles or particulate matter. Depending on the sample introduction device and other components present in the system, analyte in the fluid, analyte in the particles, the particles themselves or any combination thereof can be analyzed using the MS system 700.

In some configurations, the ionization device/source 720 may comprise many different types of devices that can receive a fluid from the fluid vials of the rack mount 710 and ionize/atomize analyte in the fluid sample. In some examples, the ionization device 720 may comprise an inductively coupled plasma that can be produced using a torch and an induction device, a capacitively coupled plasma, an electron ionization device, a chemical ionization device, a field ionization source, desorption sources such as, for example, those sources configured for fast atom bombardment, field desorption, laser desorption, plasma desorption, thermal desorption, electrohydrodynamic ionization/desorption, etc., thermospray or electrospray ionization sources or other types of ionization sources. Notwithstanding that many different types of ionization devices/sources 720 can be used, the ionization device/source 720 typically ionizes analyte ions in the sample and provides them in a fluid beam downstream to the mass analyzer 730 where the ions/atoms can be separated/selected based on different mass-to-charge ratios. Various types of ionization devices/sources and associated componentry can be found, for example, in commonly assigned U.S. Pat. Nos. 10,096,457, 9,942,974, 9,848,486, 9,810,636, 9,686,849 and other patents currently owned by PerkinElmer Health Sciences, Inc. (Waltham, Mass.) or PerkinElmer Health Sciences Canada, Inc. (Woodbridge, Canada).

In some examples, the mass analyzer 730 may take numerous forms depending generally on the sample nature, desired resolution, etc. and exemplary mass analyzers may comprise one or more rod assemblies such as, for example, a quadrupole or other rod assembly. The mass analyzer 730 may comprise one or more cones, e.g., a skimmer cone, sampling cone, an interface, ion guides, collision cells, lenses and other components that can be used to sample an entering beam received from the ionization device/source 720. The various components can be selected to remove interfering species, remove photons and otherwise assist in selecting desired ions from the entering fluid comprising the ions. In some examples, the mass analyzer 730 may be, or may include, a time of flight device. In some instances, the mass analyzer 730 may comprise its own radio frequency generator. In certain examples, the mass analyzer 730 can be a scanning mass analyzer, a magnetic sector analyzer (e.g., for use in single and double-focusing MS devices), a quadrupole mass analyzer, an ion trap analyzer (e.g., cyclotrons, quadrupole ions traps), time-of-flight analyzers (e.g., matrix-assisted laser desorbed ionization time of flight analyzers), and other suitable mass analyzers that can separate species with different mass-to-charge ratios. If desired, the mass analyzer 730 may comprise two or more different devices arranged in series, e.g., tandem MS/MS devices or triple quadrupole devices, to select and/or identify the ions that are received from the ionization device/source 720. Various components that can be present in a mass analyzer are described, for example, in commonly owned U.S. Pat. Nos. 10,032,617, 9,916,969, 9,613,788, 9,589,780, 9,368,334, 9,190,253 and other patents currently owned by PerkinElmer Health Sciences, Inc. (Waltham, Mass.) or PerkinElmer Health Sciences Canada, Inc. (Woodbridge, Canada).

In some examples, the detector 740 may be any suitable detection device that may be used with existing mass spectrometers, e.g., electron multipliers, Faraday cups, coated photographic plates, scintillation detectors, multi-channel plates, etc., and other suitable devices that will be selected by the person of ordinary skill in the art, given the benefit of this disclosure. Illustrative detectors that can be used in a mass spectrometer are described, for example, in commonly owned U.S. Pat. Nos. 9,899,202, 9,384,954, 9,355,832, 9,269,552, and other patents currently owned by PerkinElmer Health Sciences, Inc. (Waltham, Mass.) or PerkinElmer Health Sciences Canada, Inc. (Woodbridge, Canada).

In certain instances, the mass spectrometer system may also comprise a processor 750, which typically take the forms of a microprocessor and/or computer and suitable software for analysis of samples introduced into the mass spectrometer 700. While the processor 750 is shown as being electrically coupled to the mass analyzer 730 and the detector 740, it can also be electrically coupled to the other components shown in FIG. 7 to generally control or operate the different components of the system 700. In some embodiments, the processor 750 can be present, e.g., in a controller or as a stand-alone processor, to control and coordinate operation of the system 700 for the various modes of operation using the system 700. For this purpose, the processor can be electrically coupled to each of the components of the system 700, e.g., one or more pumps, one or more voltage sources, rods, etc., as well as any other voltage sources included in the system 700.

In certain configurations, the processor 750 may be present in one or more computer systems and/or common hardware circuitry including, for example, a microprocessor and/or suitable software for operating the system, e.g., to control the voltages of the ion source, pumps, mass analyzer, detector, etc. In some examples, any one or more components of the system 700 may comprise its own respective processor, operating system and other features to permit operation of that component. The processor can be integral to the systems or may be present on one or more accessory boards, printed circuit boards or computers electrically coupled to the components of the system. The processor is typically electrically coupled to one or more memory units to receive data from the other components of the system and permit adjustment of the various system parameters as needed or desired. The processor may be part of a general-purpose computer such as those based on Unix, Intel PENTIUM-type processor, Apple A series processors, Motorola PowerPC, Sun UltraSPARC, Hewlett-Packard PA-RISC processors, or any other type of processor. One or more of any type computer system may be used according to various embodiments of the technology. Further, the system may be connected to a single computer or may be distributed among a plurality of computers attached by a communications network. It should be appreciated that other functions, including network communication, can be performed and the technology is not limited to having any particular function or set of functions. Various aspects may be implemented as specialized software executing in a general-purpose computer system. The computer system may include a processor connected to one or more memory devices, such as a disk drive, memory, or other device for storing data. Memory is typically used for storing programs, calibrations and data during operation of the system in the various modes using the gas mixture. Components of the computer system may be coupled by an interconnection device, which may include one or more buses (e.g., between components that are integrated within a same machine) and/or a network (e.g., between components that reside on separate discrete machines). The interconnection device provides for communications (e.g., signals, data, instructions) to be exchanged between components of the system. The computer system typically can receive and/or issue commands within a processing time, e.g., a few milliseconds, a few microseconds or less, to permit rapid control of the system 700. For example, computer control can be implemented to control the vacuum pressure, to control spinning speed of the fluid vials, to control spinning direction of the fluid vials, to control overall spinning times, etc. The processor typically is electrically coupled to a power source which can, for example, be a direct current source, an alternating current source, a battery, a fuel cell or other power sources or combinations of power sources. The power source can be shared by the other components of the system. The system may also include one or more input devices, for example, a keyboard, mouse, trackball, microphone, touch screen, manual switch (e.g., override switch) and one or more output devices, for example, a printing device, display screen, speaker. In addition, the system may contain one or more communication interfaces that connect the computer system to a communication network (in addition or as an alternative to the interconnection device). The system may also include suitable circuitry to convert signals received from the various electrical devices present in the systems. Such circuitry can be present on a printed circuit board or may be present on a separate board or device that is electrically coupled to the printed circuit board through a suitable interface, e.g., a serial ATA interface, ISA interface, PCI interface or the like or through one or more wireless interfaces, e.g., Bluetooth, Wi-Fi, Near Field Communication or other wireless protocols and/or interfaces.

In certain embodiments, the storage system used in the systems described herein typically includes a computer readable and writeable non-volatile recording medium in which codes can be stored that can be used by a program to be executed by the processor or information stored on or in the medium to be processed by the program. The medium may, for example, be a hard disk, solid state drive or flash memory. Typically, in operation, the processor causes data to be read from the non-volatile recording medium into another memory that allows for faster access to the information by the processor than does the medium. This memory is typically a volatile, random access memory such as a dynamic random access memory (DRAM) or static memory (SRAM). It may be located in the storage system or in the memory system. The processor generally manipulates the data within the integrated circuit memory and then copies the data to the medium after processing is completed. A variety of mechanisms are known for managing data movement between the medium and the integrated circuit memory element and the technology is not limited thereto. The technology is also not limited to a particular memory system or storage system. In certain embodiments, the system may also include specially-programmed, special-purpose hardware, for example, an application-specific integrated circuit (ASIC) or a field programmable gate array (FPGA). Aspects of the technology may be implemented in software, hardware or firmware, or any combination thereof. Further, such methods, acts, systems, system elements and components thereof may be implemented as part of the systems described above or as an independent component. Although specific systems are described by way of example as one type of system upon which various aspects of the technology may be practiced, it should be appreciated that aspects are not limited to being implemented on the described system. Various aspects may be practiced on one or more systems having a different architecture or components. The system may comprise a general-purpose computer system that is programmable using a high-level computer programming language. The systems may be also implemented using specially programmed, special purpose hardware. In the systems, the processor is typically a commercially available processor such as the well-known Pentium class processors available from the Intel Corporation. Many other processors are also commercially available. Such a processor usually executes an operating system which may be, for example, the Windows 95, Windows 98, Windows NT, Windows 2000 (Windows ME), Windows XP, Windows Vista, Windows 7, Windows 8 or Windows 10 operating systems available from the Microsoft Corporation, MAC OS X, e.g., Snow Leopard, Lion, Mountain Lion or other versions available from Apple, the Solaris operating system available from Sun Microsystems, or UNIX or Linux operating systems available from various sources. Many other operating systems may be used, and in certain embodiments a simple set of commands or instructions may function as the operating system.

In certain examples, the processor and operating system may together define a platform for which application programs in high-level programming languages may be written. It should be understood that the technology is not limited to a particular system platform, processor, operating system, or network. Also, it should be apparent to those skilled in the art, given the benefit of this disclosure, that the present technology is not limited to a specific programming language or computer system. Further, it should be appreciated that other appropriate programming languages and other appropriate systems could also be used. In certain examples, the hardware or software can be configured to implement cognitive architecture, neural networks or other suitable implementations. If desired, one or more portions of the computer system may be distributed across one or more computer systems coupled to a communications network. These computer systems also may be general-purpose computer systems. For example, various aspects may be distributed among one or more computer systems configured to provide a service (e.g., servers) to one or more client computers, or to perform an overall task as part of a distributed system. For example, various aspects may be performed on a client-server or multi-tier system that includes components distributed among one or more server systems that perform various functions according to various embodiments. These components may be executable, intermediate (e.g., IL) or interpreted (e.g., Java) code which communicate over a communication network (e.g., the Internet) using a communication protocol (e.g., TCP/IP). It should also be appreciated that the technology is not limited to executing on any particular system or group of systems. Also, it should be appreciated that the technology is not limited to any particular distributed architecture, network, or communication protocol.

In some instances, various embodiments may be programmed using an object-oriented programming language, such as, for example, SQL, SmallTalk, Basic, Java, Javascript, PHP, C++, Ada, Python, iOS/Swift, Ruby on Rails or C # (C-Sharp). Other object-oriented programming languages may also be used. Alternatively, functional, scripting, and/or logical programming languages may be used. Various configurations may be implemented in a non-programmed environment (e.g., documents created in HTML, XML or other format that, when viewed in a window of a browser program, render aspects of a graphical-user interface (GUI) or perform other functions). Certain configurations may be implemented as programmed or non-programmed elements, or any combination thereof. In some instances, the systems may comprise a remote interface such as those present on a mobile device, tablet, laptop computer or other portable devices which can communicate through a wired or wireless interface and permit operation of the systems remotely as desired.

Figure 8:
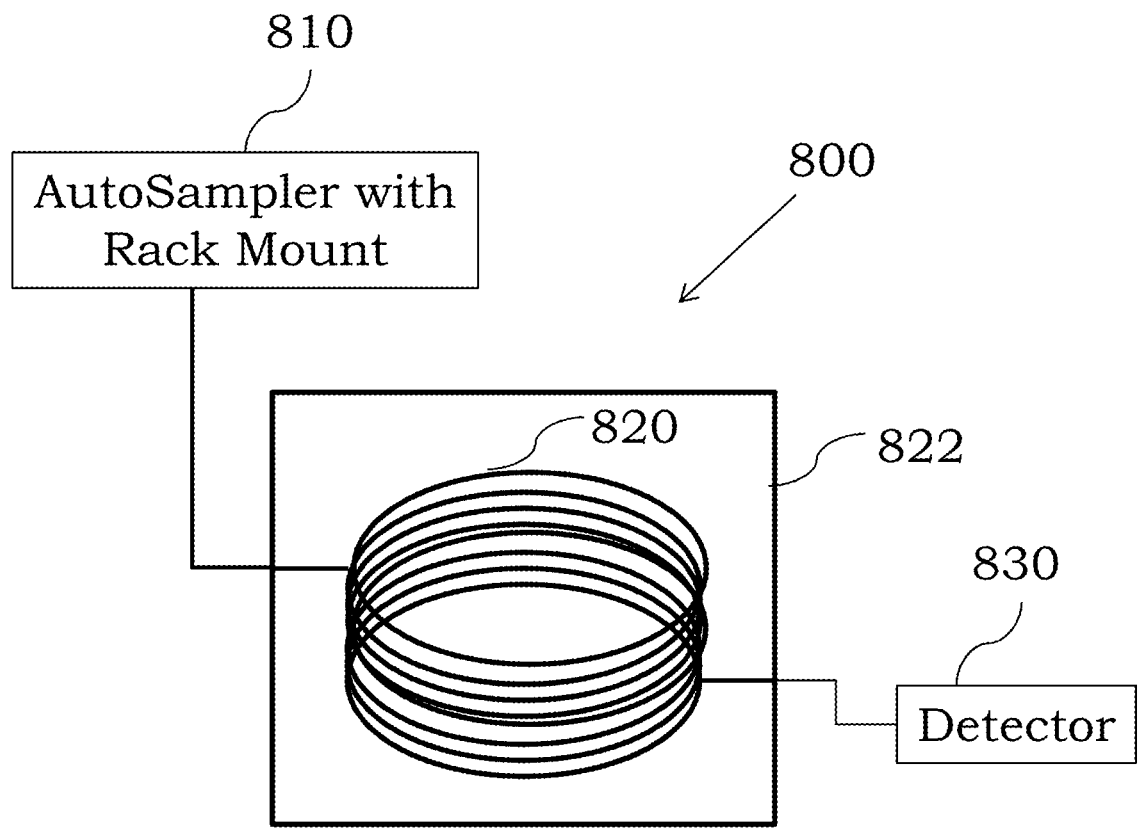
FIG. 8 is an illustration of a gas chromatography system that can be used with the fluid vials and rack mount, in accordance with certain embodiments.

In certain examples, the rack mount systems described herein can be used with fluid handling apparatus that are often used in combination with gas chromatography devices or liquid chromatography devices or fluid handling apparatus or fluid handling systems. For example, a gas comprising suspended particulate matter can be present in a fluid vial and sampled using a needle/syringe and a gas chromatography device. In other instances, a liquid comprising suspended particulate matter can be present in a fluid vial and sampled using an injector and a liquid chromatography device. Referring to FIG. 8, a gas chromatography device 800 is shown as being fluidically coupled to an auto sampler with rack mount 810. The gas chromatography device 800 typically comprises a column 820 positioned in an oven 822 configured to maintain the any sample in the gas phase as it passes through the column 810. A carrier gas (not shown) can be used to carry analyte from the rack mount 810 into the column 820, where different analytes can then be separated using the carrier gas mobile phase and the stationary phase present in the column 820. The effluent exiting the column 820 can be provided to a detector 830 to detect the separated analytes. For example, individual analyte components may sequentially be provided to a detector, e.g., a flame ionization detector, a flame photometric detector, a thermal conductivity detector, an electron capture detector, a nitrogen-phosphorous detector, a photo-ionization detector, a thermionic ionization detector, a mass spectrometer and other detectors. Following detection of analyte in fluid sample from one fluid vial, fluid in another fluid vial can then be sampled and provided to the gas chromatography device 800 for analyte separation and detection. This process can be repeated until the fluid in all fluid vials is analyzed. A second rack mount comprising additional fluid vials can then be placed into the auto sampler, e.g., manually or using automated means such as robotic arms, to permit analysis of analyte of fluids in the fluid vials of the second rack mount. As noted herein, the fluid vials present in the various rack mounts can be rotated sequentially clockwise then counter-clockwise then clockwise, etc. direction prior to and during sampling/analysis. Each vial may comprise a septum where the fluid in the vial is a gas or may be open to the atmosphere where the fluid to be introduced into the gas chromatography device 800 is a liquid that is vaporized using a heated injector or other devices. While not shown, the system 800 can be controlled by a processor to control, for example, carrier gas flow rates, spinning speeds, spinning times, heating profiles, etc.

Figure 9:
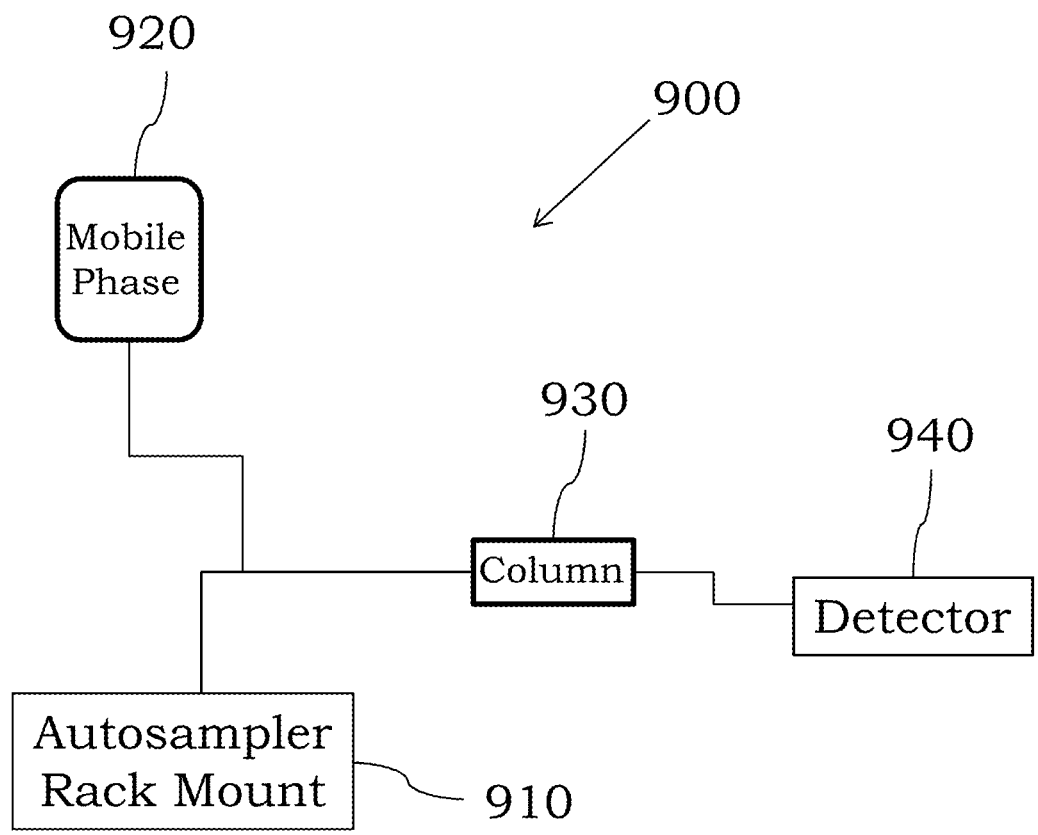
FIG. 9 is an illustration of a liquid chromatography system that can be used with the fluid vials and rack mounts, in accordance with some examples.

In certain embodiments and referring to FIG. 9, a liquid chromatography system 900 is shown that includes an auto sampler rack mount 910, a liquid mobile phase 920, a chromatography column 930 and a detector 940. Liquid sample from a fluid vial in the auto sampler rack mount 910 can be provided through an injector (not shown) and into the chromatography column 930 where analytes in the provided fluid are separated from each other using the mobile phase 920 and the stationary phase present in the column 930. The separated analytes are sequentially provided to a detector 940 where each analyte can be detected. Various detectors can be used including, but not limited to, absorbance detectors, fluorescence detectors, refractive index detectors, light scattering detectors, electrochemical detectors, a mass spectrometer, and other suitable detectors. Following detection of analyte in fluid sample from one fluid vial, fluid in another fluid vial can then be sampled and provided to the liquid chromatography device 900 for analyte separation and detection. This process can be repeated until the liquid in all fluid vials is analyzed. A second rack mount comprising additional fluid vials can then be placed into the auto sampler, e.g., manually or using automated means such as robotic arms, to permit analysis of analyte of liquids (and materials therein) in the fluid vials of the second rack mount using liquid chromatography. As noted herein, the fluid vials present in the various rack mounts can be rotated sequentially clockwise then counterclockwise then clockwise, etc. direction prior to and during sampling/analysis using the liquid chromatography system 900. While not shown, the system 900 can be controlled by a processor to control mobile phase flow rates, spinning speeds, spinning times, solvent gradients, etc.

In certain embodiments, the devices described herein can be used to mix fluid in a fluid vial prior to and/or during sampling of the fluid from the fluid vial. For example, rotationally spinning the fluid vial in a first rotational direction for a first rotational period can be performed to mix the fluid using an internal mixing feature in the fluid vial. Rotationally spinning the fluid vial in a second rotational direction opposite the first rotational direction for a second rotational period can be performed to mix the fluid using the internal mixing feature in the fluid vial. The exact time when each vial is rotated in any direction can vary, for example, from about 1 second to about 60 seconds. Without wishing to be bound by any particular theory, continued rotation of the fluid vial in any one rotational direction can result in reduced mixing over time as the fluid's rotational velocity starts to mirror the rotational velocity of the vial. To avoid this scenario, rotational direction can be periodically reversed. For example, sequential rotation in each direction for about 20-30 seconds can be continuously implemented to mix the components in the fluid. The exact rotational rate may vary depending on the overall fluid volume, fluid density and fluid temperature. In a typical configuration of the fluid vials, the overall fluid volume can be up to 5 mL or 10 mL or even 50 mL as desired. Larger fluid volumes are also possible where, for example, sample is continuously removed from the fluid vial during analysis.

Figure 10:
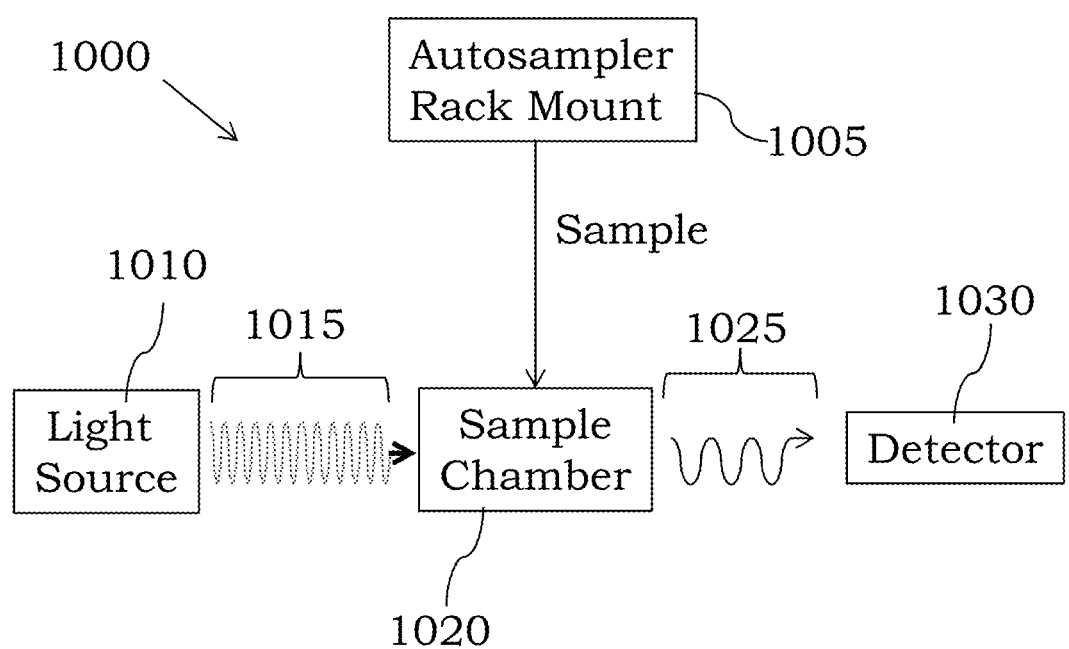
FIG. 10 is an illustration of a light emission/scattering system that can be used with the fluid vials and rack mounts, in accordance with certain examples.

In certain examples, the autosampler rack mount systems described herein could be used with systems other than mass spectrometer systems and fluid handling apparatus including but not limited to optical systems, e.g., light scattering systems, fluorescence systems, phosphorescence systems, Raman systems, etc., cell sorting and/or counting systems, nanoparticle analyzers, an ICP-optical emission spectrometer, etc. An illustration of an optical emission or light scattering system is shown in FIG. 10. The system 1000 comprises a light source 1010 that is configured to provide light 1015 to a sample chamber 1020. If desired, the sample chamber 1020 could be omitted and light could be provided directly to a fluid vial in the autosampler rack mount 1005. In some instances, fluid from a fluid vial in the auto sampler rack mount 1005 can be provided into the sample chamber 1020, which can take the form of a fixed cell, flow cell, cuvette or an optically transparent reservoir that can hold fluid at least for some period. The light 1015 acts to excite the analyte in the sample chamber 1020. The excited analyte can emit light or scatter light, e.g., in the form of one or more photon(s) 1025, which can be detected using the detector 1030. While not shown, a monochromator and/or optical spectrometer could be present between the sample chamber 1020 and the detector 1030 to filter or select a particular wavelength or wavelength range in the emitted photons 1025. The detector or detection device 1030 may take numerous forms and may be any suitable device that may detect the emitted or scatter light from the sample chamber 1020. For example, the detector 1030 may include suitable optics, such as lenses, mirrors, prisms, windows, band-pass filters, gratings, etc. The detector 1030 may also be configured as a camera such as a charge couple device (CCD) camera, a complementary metal-oxide-semiconductor (CMOS) detector or other types of detectors such as a photomultiplier tube. The sample chamber 1020 is typically configured to receive a liquid from a liquid vial in the autosampler rack mount 1005, though if desired, the sample chamber 1020 could be configured to receive a gas and retain the gas within the chamber 1020 for analysis.

Figure 11:
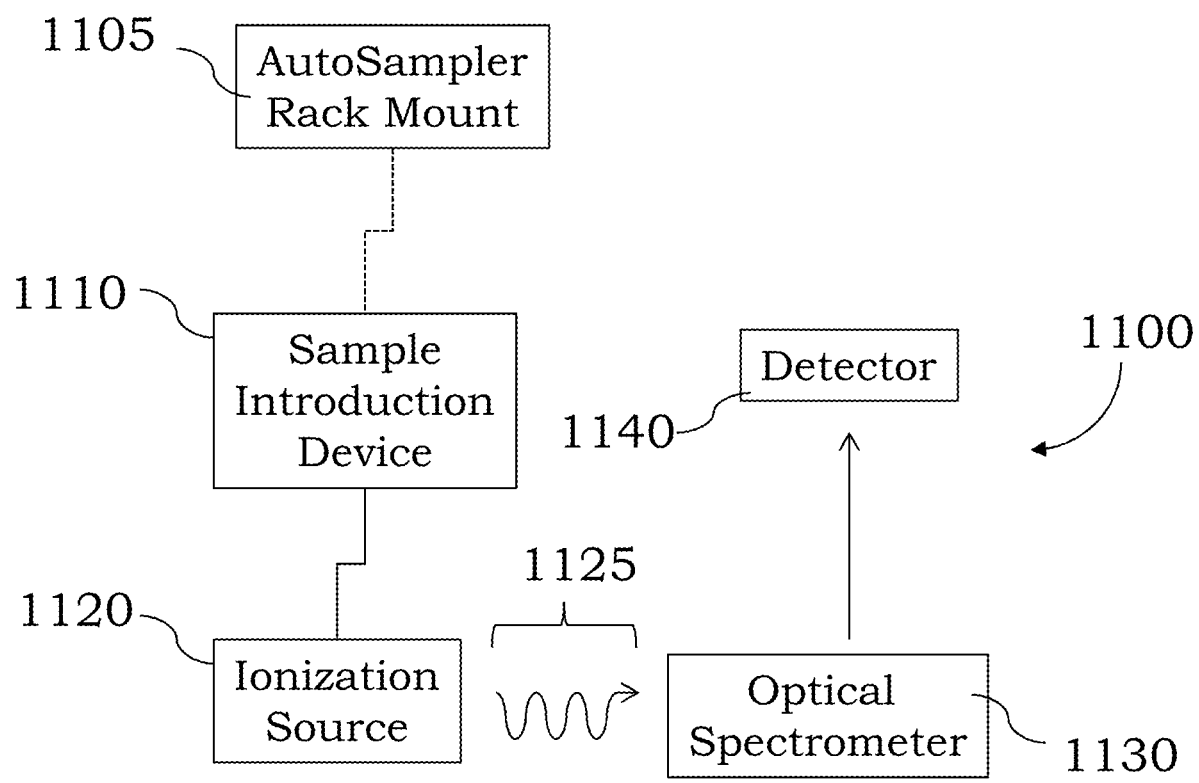
FIG. 11 is an illustration of an ICP-optical emission spectrometer that can be used with the fluid vials and rack mounts, in accordance with some embodiments.

Referring to FIG. 11, an optical emission system 1100 is shown that can be used with the autosampler rack mounts described herein. The system 1100 comprises a sample introduction device 1110, which can be fluidically coupled to an autosampler rack mount 1105 or otherwise can receive a sample from a fluid vial in an autosampler rack mount 1105, an ionization source 1120, an optical spectrometer 1130 and a detector or detection device 1140. The sample introduction device 1110 may take many forms such as an injector, capillary tubing, a nebulizer to aerosolize liquid sample for introduction into the ionization source 1120, etc. Where a nebulizer is used, the nebulizer can take many forms including crossflow nebulizers, concentric nebulizers, microflow nebulizers or other nebulizers. Where injectors are used, the injector may take the form of a needle, capillary or other tubing with a small orifice. Additional sample introduction devices will be selected by the person of ordinary skill in the art, given the benefit of this disclosure. For example, ultrasonic pulse liquid delivery devices, droplet generators or microdrop generators can also be used as or with sample introduction devices. In addition, the nebulizer (or other sample introduction device) can be hyphenated to one or more upstream devices or instruments, e.g., liquid chromatography devices, capillary electrophoresis devices, cell sorters, cell handling apparatus, and the like. The ionization source 1120 may comprise one or more components including, for example, a torch and ionization device in the case of an inductively coupled plasma or may comprise other non-ICP sources that can ionize and/or atomize analyte in a sample, e.g., a capacitively coupled plasma, an electron ionization source, a chemical ionization source, etc. The detector or detection device 1140 may take numerous forms and may be any suitable device that may detect optical emissions, such as optical emission 1125. For example, the detector 1140 may include suitable optics, such as lenses, mirrors, prisms, windows, band-pass filters, etc. The detector 1140 may also be configured as a camera such as a charge couple device (CCD) camera, a complementary metal-oxide-semiconductor (CMOS) detector or other types of detectors such as a photomultiplier tube. The detector 1040 may be configured to detect emission wavelengths over a large wavelength range including, but not limited to, ultraviolet, visible, near and far infrared, etc. If desired, the detector 1140 can be used to provide a two-dimensional image representative of the various emitted wavelengths. The spectrometer 1100 may further include suitable electronics such as a microprocessor and/or computer and suitable circuitry to provide a desired signal and/or for data acquisition. Suitable additional devices and circuitry are known in the art and may be found, for example, on commercially available OES devices such as Optima 2100DV series, Optima 5000 DV series OES devices, Optima 8000 or 8300 series OES devices, or Avio 200 and Avio 500 OES devices commercially available from PerkinElmer Health Sciences, Inc. The optical spectrometer 1130 may be configured to separate wavelengths of light from each other, e.g., spectrally resolve the various light wavelengths in the light beam 1125, to permit detection of optical emissions from various analyte species and may comprise suitable gratings, lenses, etc., to select one or more wavelengths of light. Various different types of samples can be measured using an optical spectrometer including, for example, metal content in lubricants, particle elemental composition in lubricants and other samples which may comprise one or more metal or elemental species that emit light at a certain wavelength which can be present in the fluid or bound or otherwise present in one or more particles or structures in the fluid.

Figure 12:
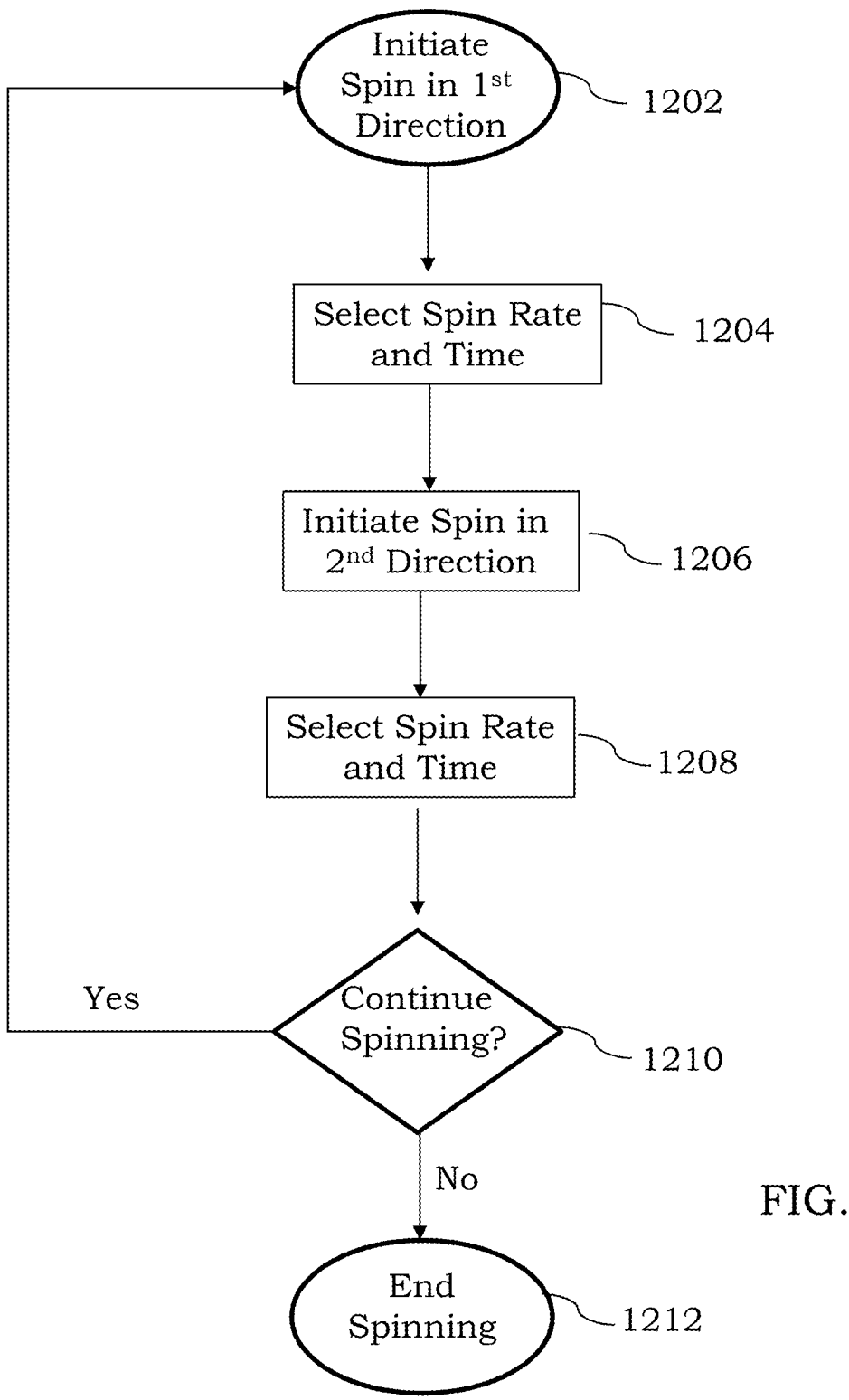
FIG. 12 is an illustration of a process that can be used to maintain or promote fluid homogeneity.

In certain embodiments, the devices and systems described herein can be used to maintain or promote fluid homogeneity. A flow chart of one process that can be used is shown in FIG. 12. Spinning of a vial in a first direction is initiated at a step 1202, e.g., spinning in a counter clockwise direction. As noted herein, in some instances, adjacent vials may spin an opposite direction to balance any spinning forces. A spin rate and time, e.g., a first rotational period, is selected at a step 1204. After the first spin time, spinning may be initiated in a second, opposite direction at a step 1206, e.g., in a clockwise direction. A spin rate and time, e.g., a second rotational period, is selected for spinning in the second direction at a step 1208. If it is desirable to continue the spinning process, then at a step 1210 the process may restart to step 1202. Once it is desirable to discontinue spinning, then the spinning process may end at a step 1212. Once the spinning is ended, new vials can be placed in the autosampler rack mount and the process may restart at step 1202.

When introducing elements of the examples disclosed herein, the articles "a," "an," "the" and "said" are intended to mean that there are one or more of the elements. The terms "comprising," "including" and "having" are intended to be open-ended and mean that there may be additional elements other than the listed elements. It will be recognized by the person of ordinary skill in the art, given the benefit of this disclosure, that various components of the examples can be interchanged or substituted with various components in other examples.

Although certain aspects, examples and embodiments have been described above, it will be recognized by the person of ordinary skill in the art, given the benefit of this disclosure, that additions, substitutions, modifications, and alterations of the disclosed illustrative aspects, examples and embodiments are possible.

What is claimed is:

1. An auto sampler rack mount configured to couple to an output shaft of a motor and configured to receive a single fluid vial at each of a plurality of fluid vial sites of the auto sampler rack mount, wherein each of the fluid vial sites is configured to receive a coupler of a respective fluid vial to couple the fluid vial to the fluid vial site, wherein each fluid vial site comprises a respective surface mount that prevents the respective coupled fluid vial from tipping or dislodging during rotation of the respective coupled fluid vial while permitting the respective coupled fluid vial to rotate independently of the surface mount, the auto sampler rack mount comprising a plurality of independent rotatable devices mechanically coupled to each other, wherein a respective rotatable device is coupled to each fluid vial site of the auto sampler rack mount that is configured to receive a single fluid vial, and wherein the rotatable devices together are configured to rotate each coupled fluid vial and are configured to rotate adjacent fluid vials in opposite circumferential directions.

2. The auto sampler rack mount of claim 1, wherein the auto sampler rack mount is configured to reverse a rotational direction of each fluid vial after a first rotation period.

3. The auto sampler rack mount of claim 2, wherein each of the plurality of independent rotatable devices comprises a planar gear comprising a plurality of teeth configured to engage teeth on an adjacent planar gear.

4. The auto sampler rack mount of claim 1, wherein each independent rotatable device is sized and arranged to rotate at a same speed.

5. The auto sampler rack mount of claim 1, wherein at least one of the independent rotatable devices is configured to rotate at a different speed.

6. The auto sampler rack mount of claim 1, wherein each of the plurality of independent rotatable devices is coupled to a receptacle configured to receive a terminal end of a respective fluid vial.

7. The auto sampler rack mount of claim 1, wherein each fluid vial site comprises a magnet configured to magnetically couple to a magnet on the fluid vial to retain the fluid vial at the fluid vial site.

8. An auto sampler rack mount configured to couple to an output shaft of a motor and configured to receive a single fluid vial at each of a plurality of fluid vial sites of the auto sampler rack mount, the auto sampler rack mount comprising a plurality of independent rotatable devices mechanically coupled to each other, wherein a respective rotatable device is coupled to each fluid vial site of the auto sampler rack mount that is configured to receive a single fluid vial, and wherein the rotatable devices together are configured to rotate each coupled fluid vial and are configured to rotate adjacent fluid vials in opposite circumferential directions, wherein the auto sampler rack mount is configured to reverse a rotational direction of each fluid vial after a first rotation period, wherein each of the plurality of independent rotatable devices comprises a pulley configured to frictionally engage a belt, wherein at least one of the pulleys is configured to couple to the output shaft of the motor, and wherein rotational movement of the pulley coupled to the output shaft of the motor is operative to rotate each of the independent rotatable pulleys with adjacent rotatable pulleys being rotated in opposite circumferential directions.

9. The autosampler rack mount of claim 8, wherein the auto sampler rack mount is configured to reverse a rotational direction of each fluid vial after a first rotation period.

10. The auto sampler rack mount of claim 8, wherein each independent rotatable device is sized and arranged to rotate at a same speed.

11. The auto sampler rack mount of claim 8, wherein at least one of the independent rotatable devices is configured to rotate at a different speed.

12. The auto sampler rack mount of claim 8, wherein each of the plurality of independent rotatable devices is coupled to a receptacle configured to receive a terminal end of a respective fluid vial.

13. The auto sampler rack mount of claim 8, wherein each fluid vial site comprises a magnet configured to magnetically couple to a magnet on the fluid vial to retain the fluid vial at the fluid vial site.

14. An auto sampler rack mount configured to couple to an output shaft of a motor and configured to receive a single fluid vial at each of a plurality of fluid vial sites of the auto sampler rack mount, the auto sampler rack mount comprising a plurality of independent rotatable devices mechanically coupled to each other, wherein a respective rotatable device is coupled to each fluid vial site of the auto sampler rack mount that is configured to receive a single fluid vial, and wherein the rotatable devices together are configured to rotate each coupled fluid vial and are configured to rotate adjacent fluid vials in opposite circumferential directions, and wherein the rack mount comprises a sensor configured to determine if fluid in at least one fluid vial is being mixed.

15. The auto sampler rack mount of claim 14, wherein the auto sampler rack mount is configured to continuously agitate fluid received by the fluid vial by rotating each fluid vial in alternating circumferential directions to keep particles in fluid in the fluid vial from settling.

16. The autosampler rack mount of claim 14, wherein the auto sampler rack mount is configured to reverse a rotational direction of each fluid vial after a first rotation period.

17. The auto sampler rack mount of claim 14, wherein each independent rotatable device is sized and arranged to rotate at a same speed.

18. The auto sampler rack mount of claim 14, wherein at least one of the independent rotatable devices is configured to rotate at a different speed.

19. The auto sampler rack mount of claim 14, wherein each of the plurality of independent rotatable devices is coupled to a receptacle configured to receive a terminal end of a respective fluid vial.

20. The auto sampler rack mount of claim 14, wherein each fluid vial site comprises a magnet configured to magnetically couple to a magnet on the fluid vial to retain the fluid vial at the fluid vial site.

* * * * *